United States Patent
Hara et al.

(10) Patent No.: US 7,681,712 B2
(45) Date of Patent: Mar. 23, 2010

(54) ALIGNMENT CONVEYOR APPARATUS

(75) Inventors: Koji Hara, Kitakyushu (JP); Kengo Egami, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 140 days.

(21) Appl. No.: 12/093,003

(22) PCT Filed: Oct. 27, 2006

(86) PCT No.: PCT/JP2006/321494

§ 371 (c)(1),
(2), (4) Date: May 8, 2008

(87) PCT Pub. No.: WO2007/055112

PCT Pub. Date: May 18, 2007

(65) Prior Publication Data
US 2009/0114508 A1 May 7, 2009

(30) Foreign Application Priority Data
Nov. 9, 2005 (JP) .............................. 2005-324233

(51) Int. Cl.
*B65G 47/31* (2006.01)
*B65G 43/08* (2006.01)
(52) U.S. Cl. ..................... 198/461.1; 198/575; 198/576; 198/577; 198/690.2; 198/699.1; 700/228
(58) Field of Classification Search ............... 198/461.1, 198/469.1, 572, 575, 576, 577, 579, 690.2, 198/699.1; 700/219, 228, 230
See application file for complete search history.

(56) References Cited

U.S. PATENT DOCUMENTS

| | | | | | |
|---|---|---|---|---|---|
| 3,485,339 | A | * | 12/1969 | Miller et al. | 198/460.1 |
| 5,228,558 | A | * | 7/1993 | Hall | 198/784 |
| 6,021,882 | A | * | 2/2000 | Juds et al. | 194/212 |
| 6,464,065 | B2 | * | 10/2002 | Herubel et al. | 198/460.1 |
| 6,629,593 | B2 | * | 10/2003 | Zeitler | 198/460.1 |
| 6,648,125 | B1 | * | 11/2003 | Bershadsky | 198/460.1 |
| 6,897,625 | B2 | * | 5/2005 | Brixius et al. | 318/69 |
| 7,016,768 | B2 | * | 3/2006 | Grafer et al. | 700/230 |
| 7,360,638 | B2 | * | 4/2008 | Ko et al. | 198/575 |
| 7,413,071 | B2 | * | 8/2008 | Zeitler et al. | 198/460.1 |

FOREIGN PATENT DOCUMENTS

| | | |
|---|---|---|
| JP | 62-153016 A | 7/1987 |
| JP | 3-147613 A | 6/1991 |
| JP | 6-127659 A | 5/1994 |
| JP | 10-324418 A | 12/1998 |
| JP | 2000-136021 A | 5/2000 |
| JP | 2003-292146 A | 10/2003 |

\* cited by examiner

*Primary Examiner*—Douglas A Hess
(74) *Attorney, Agent, or Firm*—Sughrue Mion, PLLC

(57) ABSTRACT

In an alignment conveyor apparatus including an input conveyor (1), an output conveyor (2) with a flap sensor (14), a single or a plurality of alignment conveyors (3), a product sensor (12), and a control unit (7), the control unit (7) includes an alignment conveyor controller (71) and an output conveyor controller (72), the alignment conveyor controller (71) includes a product position manager (712), a position correction calculator (713), and a position correction instruction creator (715), the output conveyor controller (72) includes an output conveyor position manager (721).

7 Claims, 9 Drawing Sheets

ALIGNMENT CONVEYOR APPARATUS

TECHNICAL FIELD

The present invention relates to an alignment conveyor apparatus that allows products carried at random intervals or being in close contact with each other to be aligned at predetermined intervals.

BACKGROUND ART

A known alignment conveyor apparatus includes an input conveyor which supplies a product, a variable-speed conveyor which performs a position correction of the product, and an output conveyor which carries the product transferred from the variable-speed conveyor (for instance, see Patent Document 1).

Here, a speed of the output conveyor is constant at a normal time, and a reference speed of the variable-speed conveyor is set to be the same as that of the output conveyor. Additionally, the speed of the variable-speed conveyor is set to the reference speed except when the position correction is performed.

Meanwhile, the speed of the input conveyor is set to be slower than that of the variable-speed conveyor. The reason is because when products which are in close contact with each other are supplied from the input conveyor, the speed of the variable-speed conveyor is made faster than that of the input conveyor so that the products which are in close contact with each other are made to be separated from each other in terms of the speed difference between the conveyors (for instance, see Patent Document 1).

In addition, the position correction of the product loaded on the variable-speed conveyor is performed by a technique in which a position correction amount is calculated on the basis of a distance from a current position to a transfer position of the output conveyor and a target position of the output conveyor, and the correction amount is corrected by the respective variable-speed conveyors in a sharing manner.

The position correction is performed in the forward direction, that is, the position correction is performed only in the direction in which the speed of the variable-speed conveyor becomes fast.

Additionally, the position correction amount is determined by calculating the position correction amount in consideration of the maximum speed of the variable-speed conveyor.

Patent Document 1: JP-A-2003-292146 (pages 10 to 17, FIG. 1)

DISCLOSURE OF THE INVENTION

Problems to be Solved by the Invention

In the past, when the products which are in close contact with each other are supplied from the input conveyor, the products are separated from each other in terms of the speed difference between the input conveyor and the variable-speed conveyor. For this reason, a carrying speed of the variable-speed conveyor has to be set sufficiently faster than a supplying speed of the input conveyor.

In addition, since the position correction is performed only in the direction in which the speed of the variable-speed conveyor becomes fast, when a remaining distance of the variable-speed conveyor is smaller than the correction target distance, it is difficult to perform the correction of the variable-speed conveyor, and thus a problem arises in that the correction has to be performed by the subsequent conveyor.

When the product is transferred onto the downstream conveyor and then the position correction of the downstream conveyor is performed, a speed difference occurs between the conveyor and the downstream conveyor, and thus a problem arises in that it is difficult to perform a transfer operation.

The present invention is contrived in consideration of the above-described problems, and an object of the invention is to provide an alignment conveyor apparatus capable of surely separating the products which are in close contact with each other and of performing the position correction in both directions in which the speed of the variable-speed conveyor becomes fast and slow. Additionally, an object of the invention is to provide an alignment conveyor apparatus capable of smoothly performing a transfer operation even when the position correction of the downstream conveyor is performed.

Means for Solving the Problems

In order to solve the above-described problems, the present invention has a following configuration.

Hereinafter, the variable-speed conveyor according to the known example will be referred to as an alignment conveyor in the embodiments according to the invention.

According to a first aspect of the invention, there is provided an alignment conveyor apparatus including:

an input conveyor which supplies a product;

an output conveyor which has flaps arranged thereon at the same intervals;

a single or a plurality of alignment conveyors which are provided between the input conveyor and the output conveyor;

a flap sensor which detects the flaps arranged on the output conveyor;

a product sensor which detects the product transferred onto the alignment conveyors; and a control unit which is connected to the alignment conveyors and the output conveyor, wherein the control unit includes an alignment conveyor controller which performs a position management and a position correction of the product on the alignment conveyors, and an output conveyor controller which performs a position management of the output conveyor, and wherein the output conveyor controller includes an output conveyor position manager which manages a product transfer position A between the flaps, wherein the alignment conveyor controller includes a product position manager which manages a position of the product on the alignment conveyors, a position correction calculator which obtains a position correction amount of the foremost product on the alignment conveyors on the basis of the product transfer position between the flaps and the position of the product on the alignment conveyors, and a position correction instruction creator which creates smooth cam curve data satisfying the position correction amount, wherein the alignment conveyor controller independently controls the alignment conveyors to be synchronized with the subsequent downstream alignment conveyor except when the position correction of the alignment conveyors is performed, and wherein the position correction calculator compares a remaining distance from the position of the product to the subsequent downstream conveyor with a correction target distance so that the position correction is performed in a direction in which a speed of the alignment conveyors becomes faster than predetermined speed when the remaining distance is larger than the correction target distance, or in a direction in which the speed of the alignment conveyors becomes slower than predetermined speed when the remaining distance is smaller than the correction target distance.

According to a second aspect of the invention, there is provided an alignment conveyor apparatus according to the first aspect, wherein the position correction calculator obtains a correctable distance by using acceleration which is set within a range not causing a positional slippage during the position correction, and limits the position correction amount on the basis of the correctable distance.

According to a third aspect of the invention, there is provided an alignment conveyor apparatus according to the first aspect, wherein the product position manager includes a product close contact detector and sets a position of the foremost product on the upstream side to a position which is obtained by subtracting a product length from a start position of a product sensor signal ON in a case that the product close contact detector determines that the products are in close contact with each other when a travel distance of the product sensor signal ON is larger than a value obtained by multiplying the product length by a coefficient.

According to a forth aspect of the invention, there is provided an alignment conveyor apparatus according to the forth aspect, wherein when the product close contact detector determines that the products are in close contact with each other, a close contact detection process is performed in such a manner that the position which is obtained by subtracting the product length from the start position of the product sensor signal ON is set to a start position of a virtual product sensor signal ON.

According to a sixth aspect of the invention, there is provided an alignment conveyor apparatus according to the first aspect, wherein when it is determined that the products are in close contact with each other, the position correction calculator decreases a speed of the upstream alignment conveyor, when the foremost product among the products being in close contact with each other is transferred onto the downstream alignment conveyor, to allow the position of the product on the upstream side to slowly advance so that the products which are in close contact with each other are separated from each other.

According to a fifth aspect of the invention, there is provided an alignment conveyor apparatus according to the first aspect, wherein the output conveyor controller further includes a virtual flap sensor, and the virtual flap sensor outputs a flap sensor signal at every flap interval length which is arbitrarily set.

Advantage of the Invention

According to the first aspect of the invention, since the alignment conveyors are synchronized with the subsequent downstream conveyor even when the correction of the subsequent downstream conveyor is performed, that is, the product is transferred onto the subsequent downstream conveyor, it is possible to smoothly perform the transfer operation in which the product is transferred onto the subsequent downstream conveyor.

Further, since the correction can be performed in the direction in which the speed of the alignment conveyor becomes slow when the remaining distance is smaller than the correction target distance or a correctable amount is smaller than the correction target distance, it is possible to control the product to be inserted into the subsequent flap interval by performing the position correction from the backside of the product.

Accordingly, it is possible to complete the position correction within the alignment conveyors with a little position correction amount.

According to the second aspect of the invention, since the position correction is performed within the acceleration in consideration of the friction between the product and the conveyor, it is possible to accurately perform the position correction in accordance with the instruction without causing the positional deviation during the position correction.

According to the third aspect of the invention, since it is possible to detect the close contact state and to determine the position of the product on the upstream side, it is possible to surely perform the position correction even in the close contact state.

According to the forth aspect of the invention, since it is possible to continuously detect the close contact state by detecting the close contact state and by activating the virtual product sensor with respect to the product on the upstream side, it is possible to detect the close contact state and to perform the separation even when two or more products are in close contact with each other.

According to the sixth aspect of the invention, since the products are separated from each other by decreasing the speed of the upstream alignment conveyor when the products being in close contact with each other on the downstream side are completely transferred onto the subsequent downstream conveyor, it is not necessary to allow the speed of the input conveyor to be slower than that of the alignment conveyors.

Further, according to the fifth aspect of the invention, since the arbitrary flap interval length can be realized by the virtual flap sensor, it is not necessary to change a mechanic configuration of the output conveyor when the size of the product or the alignment interval of the output conveyor is changed.

BEST MODE FOR CARRYING OUT THE INVENTION

DESCRIPTION OF REFERENCE NUMERALS AND SIGNS

1: INPUT CONVEYOR
2: OUTPUT CONVEYOR
3: ALIGNMENT CONVEYOR (3a, 3b, 3c, 3d)
7: CONTROL UNIT
8: SERVO DRIVER (8a, 8b, 8c, 8d)
9: INVERTER
11: PRODUCT TO BE SUPPLIED
12: PRODUCT SENSOR (12a, 12b, 12c, 12d)
13: FLAP
14: FLAP SENSOR
71: ALIGNMENT CONVEYOR CONTROLLER (71a, 71b, 71c, 71d)
72: OUTPUT CONVEYOR CONTROLLER
81: SERVO MOTOR (81a, 81b, 81c, 81d)
82: ENCODER (82a, 82b, 82c, 82d)
91: INDUCTION MOTOR
92: ENCODER
712: PRODUCT POSITION MANAGER
7121: PRODUCT CLOSE CONTACT DETECTOR
713: POSITION CORRECTION CALCULATOR
715: POSITION CORRECTION INSTRUCTION CREATOR
721: OUTPUT CONVEYOR POSITION MANAGER
722: VIRTUAL FLAP SENSOR

BEST MODE FOR CARRYING OUT THE INVENTION

Hereinafter, exemplary embodiments of the invention will be described with reference to the accompanying drawings.

First Embodiment

Figure 1:
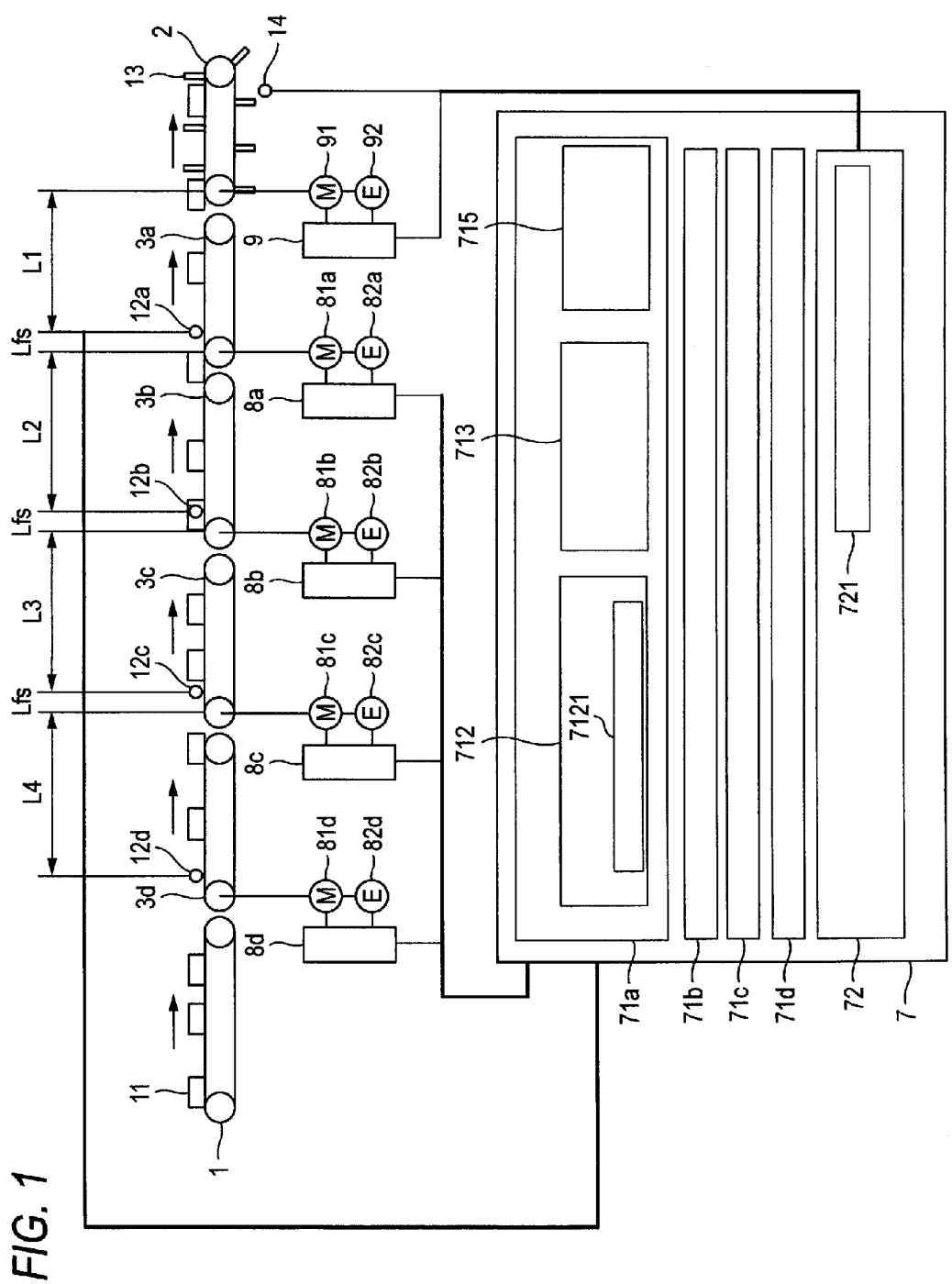
FIG. 1 is a configuration diagram illustrating an alignment conveyor apparatus according to a first embodiment of the invention.

FIG. 1 is a configuration diagram illustrating an alignment conveyor apparatus according to a first embodiment of the invention.

In the drawing, the alignment conveyor apparatus includes an input conveyor 1, an output conveyor 2, an alignment conveyor 3 which is disposed between the input conveyor 1 and the output conveyor 2, and a control unit 7 which controls the output conveyor 2 and the alignment conveyor 3.

The output conveyor 2 is provided with flaps 13 which are arranged at the same intervals and is attached with a flap sensor 14 which detects the flaps 13.

A driving roller of the output conveyor 2 is connected to an induction motor 91 and an encoder 92, and the induction motor 91 and the encoder 92 are connected to an inverter 9.

A driving roller of the alignment conveyor 3 is connected to a servo motor 81 and an encoder 82 which are connected to a servo driver 8.

A transfer position on the upstream side of the alignment conveyor 3 is attached with a product sensor 12.

The inverter 9, the servo driver 8, the product sensor 12, and the flap sensor 14 are connected to the control unit 7.

The control unit 7 includes an alignment conveyor controller 71 and an output conveyor controller 72.

The alignment conveyor controller 71 includes a product position manager 712, a position correction calculator 713, and a position correction instruction creator 715. The product position manager 712 includes a product close contact detector 7121.

The output conveyor controller 72 includes an output conveyor position manager 721.

Although a relationship of the respective function blocks is not shown in the drawing, the output conveyor controller 72 transmits flap position information to the alignment conveyor controller 71. Additionally, conveyor speed information is transmitted between the alignment conveyor controllers 71.

The invention is different from Patent Document 1 in that an independent alignment conveyor controller 71 is provided for each alignment conveyor and the product position manager 712 of the alignment conveyor controller 71 is provided with the product close contact detector 7121.

Hereinafter, operations of the respective components will be described.

The input conveyor 1 supplies a product onto the alignment conveyor 3.

The output conveyor 2 carries the product between the flaps 13. The output conveyor 2 is operated at a constant speed at a normal time by an induction motor and an inverter.

The flap sensor 14 transmits information on whether the flaps 13 are passed or not to the control unit 7.

The product sensor 12 is installed at a position for checking a state that the product is completely loaded on the alignment conveyor and transmits information on whether the product is transferred onto the alignment conveyor to the control unit 7.

The control unit 7 includes the alignment conveyor controller 71 and the output conveyor controller 72 for each alignment conveyor.

The output conveyor controller 72 controls the output conveyor 2 to be operated at a predetermined speed and manages flap position information in terms of the signals output from the encoder 92 and the flap sensor 14. The flap position information is transmitted to the alignment conveyor controller 71.

Meanwhile, the alignment conveyor controller 71 receives the signals output from the encoder 82 and the product sensor 12, and receives the flap position information output from the output conveyor controller 72. Here, the product position manager 712 manages the position of the product loaded on the conveyor, the position correction calculator 713 performs a position correction calculation, and then the position correction instruction creator 715 creates a position correction instruction, so that a servo motor 81 for the driving roller is driven by the position correction instruction. In this way, the position correction is performed.

Here, the carrying speeds of the respective conveyors are set such that a speed of the alignment conveyor 3 is equivalent to that of the output conveyor 2 and a speed of the input conveyor 1 is equivalent to that of the alignment conveyor 3.

Figure 2:
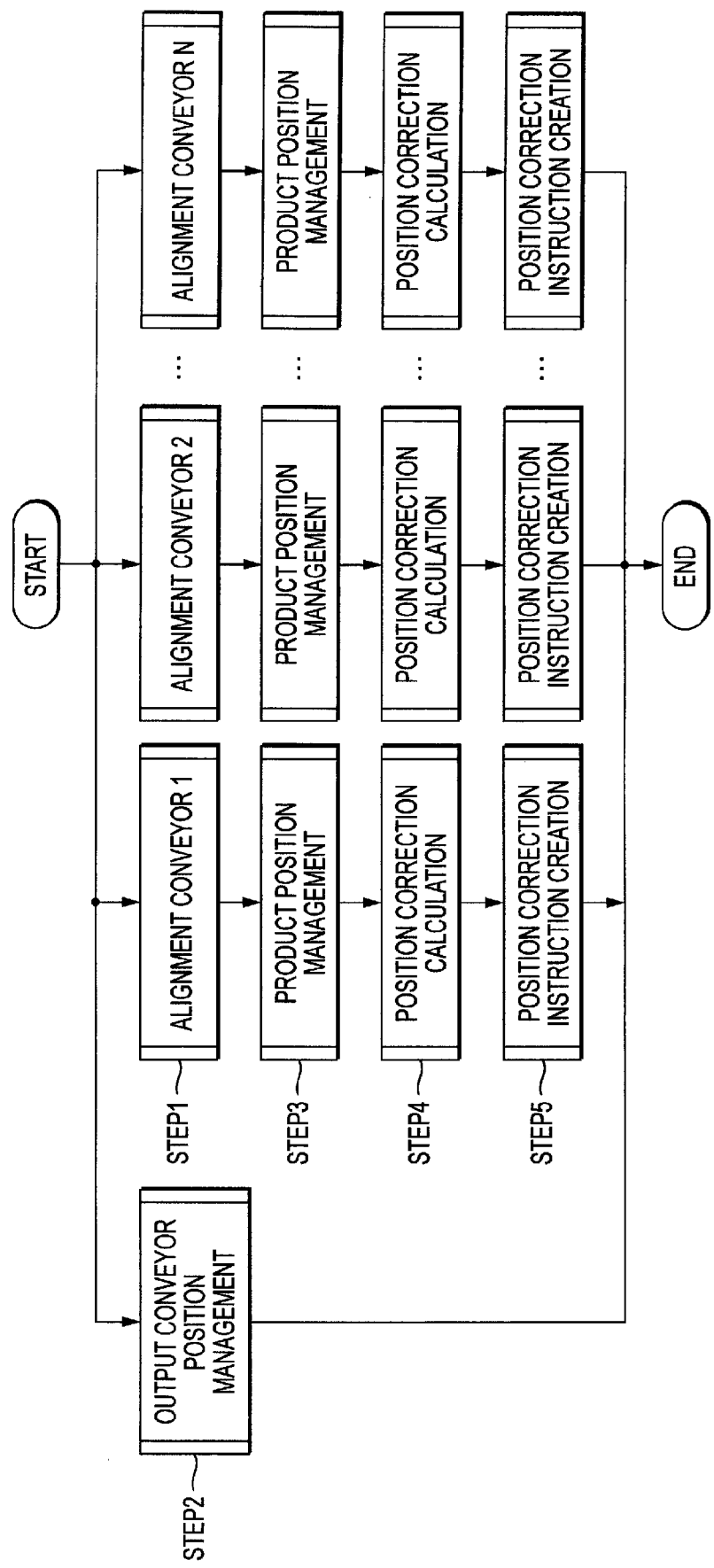
FIG. 2 is a control flowchart illustrating the alignment conveyor apparatus according to the invention.

FIG. 2 is a control flowchart illustrating the alignment conveyor apparatus according to the first embodiment of the invention.

Since the number of the alignment conveyors shown in FIG. 1 is four units, the number of the alignment conveyors shown in FIG. 2 is four units in the same way.

An independent controller is provided for each of the alignment conveyors, and performs the same processes.

As the processes of the respective alignment conveyors, a product position management (STEP 3), a position correction calculation (STEP 4), a position correction instruction creation (STEP 5) are performed.

In addition, as the process of the output conveyor, an output conveyor position management (STEP 2) is performed, and the information is used for the processes of the respective alignment conveyors.

In this way, a position correction is performed in the respective alignment conveyors, and then the product is finally transferred onto a predetermined position of the output conveyor.

Hereinafter, operations of the steps shown in FIG. 2 will be described.

Figure 3:
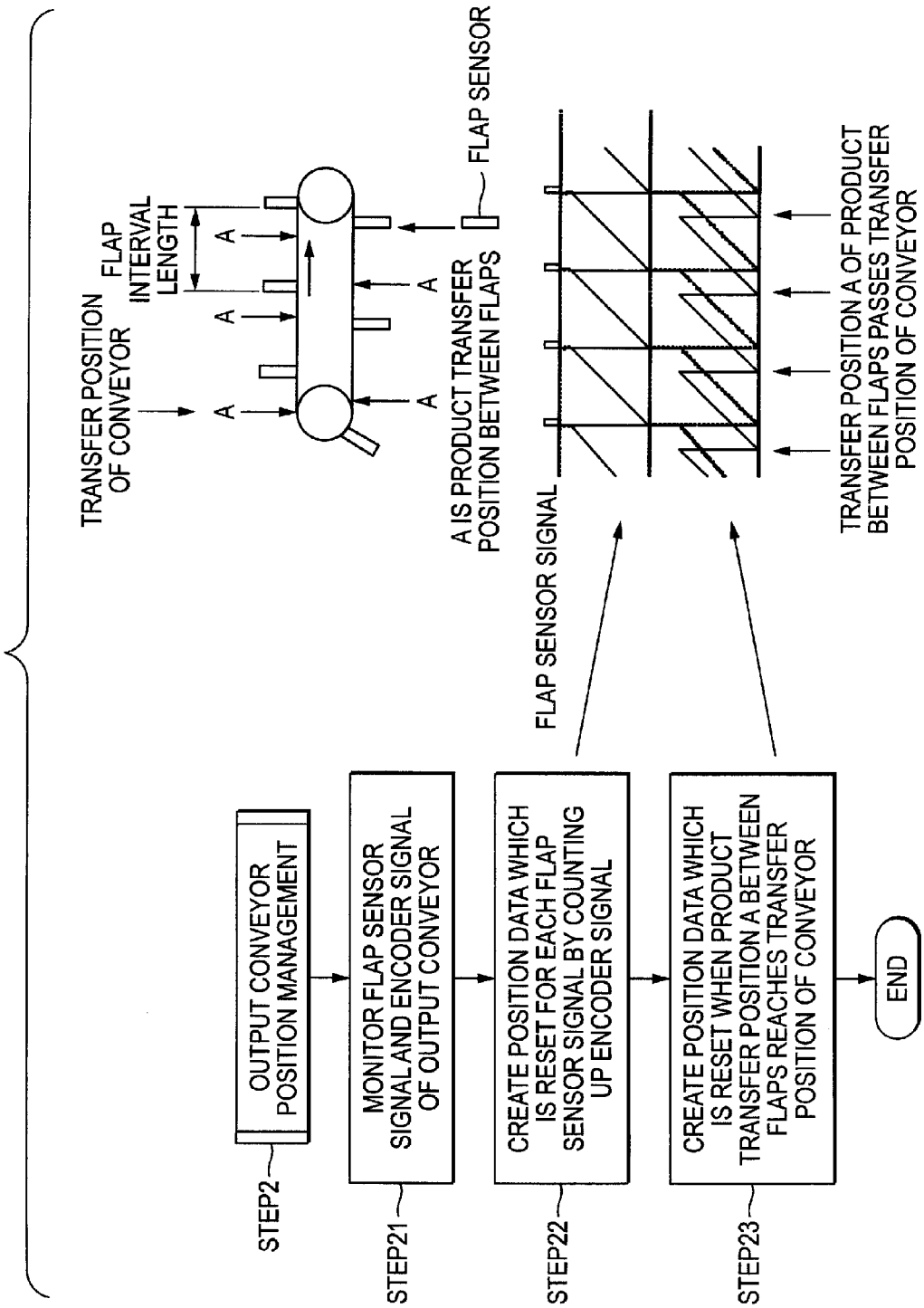
FIG. 3 is a specific flowchart illustrating an output conveyor position management shown in the control flowchart according to the first embodiment of the invention.

FIG. 3 is a specific flowchart illustrating an output conveyor position management shown in the control flowchart according to the first embodiment of the invention. The output conveyor position management is performed by the output conveyor position manager 721 of the output conveyor controller 72. Hereinafter, a description thereof will be carried out with reference to the drawing.

First, the encoder 92 and the flap sensor 14 of the output conveyor 2 are monitored (STEP 21).

Subsequently, by counting up a pulse signal of the encoder 92, sawtooth wave-shaped position data which is reset whenever the flap sensor 14 detects the flaps is obtained (STEP 22).

Subsequently, the position data obtained from STEP 22 is converted into sawtooth wave-shaped position data which is reset whenever a transfer position A of the product between the flaps reaches a transfer position of the output conveyor (STEP 23).

That is, the output conveyor position management means that a motion of the product transfer position A between the flaps is managed. The position data is used for a position correction calculation which is described later.

Figure 4:
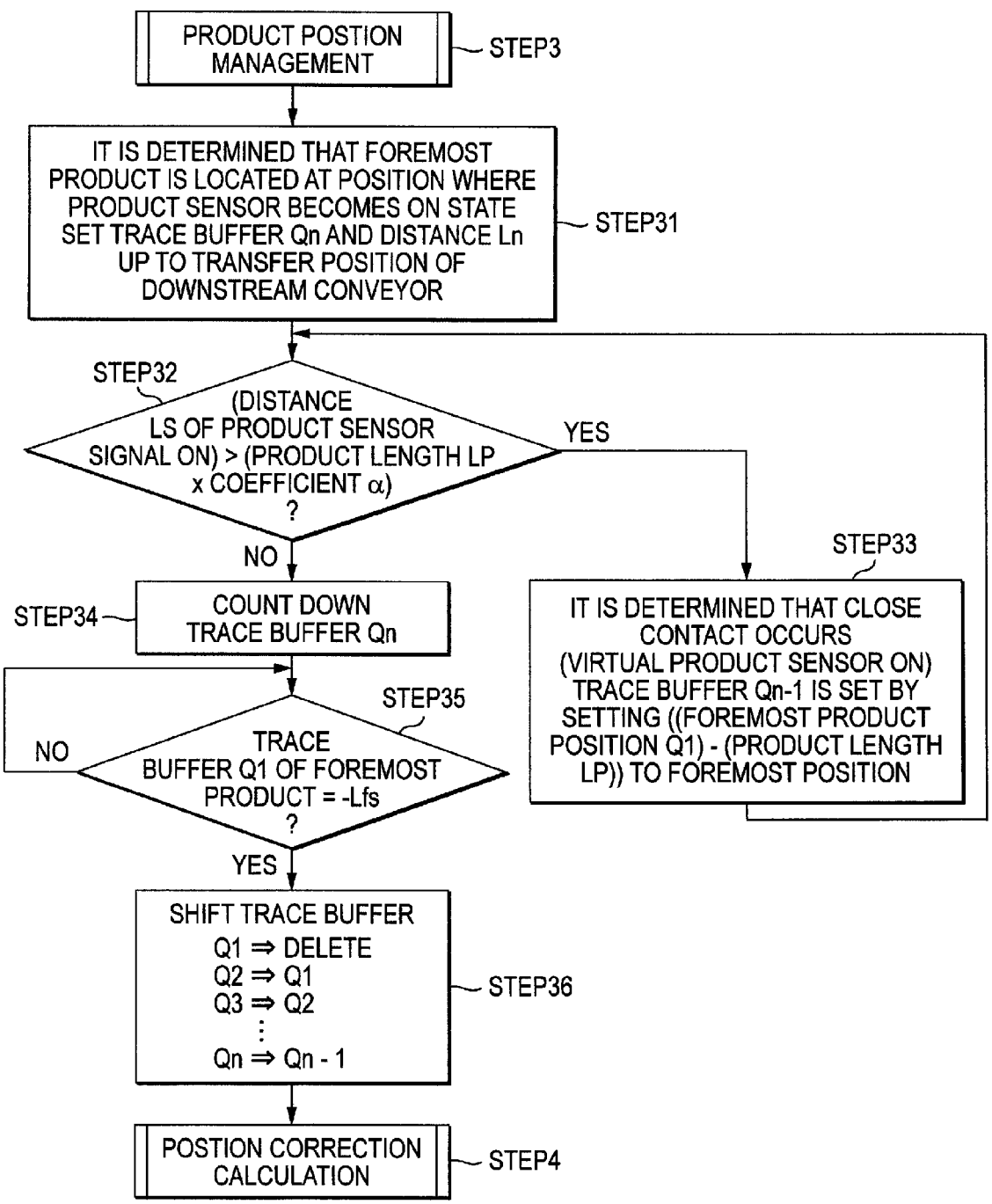
FIG. 4 is a specific flowchart illustrating the product position management shown in the control flowchart according to the first embodiment of the invention.

FIG. 4 is a specific flowchart illustrating the product position management shown in the control flowchart according to the first embodiment of the invention. The product position management is performed by the product position manager 712 of the alignment conveyor controller 71. Hereinafter, a description thereof will be carried out with reference to the drawing.

When the product is transferred from the input conveyor 1 onto the alignment conveyor 3 or the product is transferred from the alignment conveyor 3 onto the subsequent downstream alignment conveyor 3, the product sensor 12 becomes an ON state when detecting the product. Here, a rising position of the product sensor signal is set to the leading end of the product, and herein a trace buffer Qn for the position management is set. The product sensor becomes an ON state when the product passes, and then a signal corresponding to a length of the product is obtained.

The trace buffer Qn is a buffer for tracing a product position, and is sequentially allocated to the foremost product loaded on the alignment conveyor. That is, a trace buffer Q1 is allocated to the product on the most downstream side, and then a trace buffer Q2 is allocated to the second product.

A distance Ln from the product sensor 12 to the transfer position of the subsequent downstream conveyor is set to the trace buffer Qn when the product is detected. As shown in FIG. 1, the distance Ln is set such that a distance L1 is set in the alignment conveyor 1, a distance L2 is set in the alignment conveyor 2, a distance L3 is set in the alignment conveyor 3, and a distance L4 is set in the alignment conveyor 4 (STEP 31).

Subsequently, the product close contact detector 7121 detects whether the products are in close contact with each other. While the product sensor 12 is in an ON state, a travel distance of the alignment conveyor 3 is counted, and a travel distance count value LS is compared with a value obtained by multiplying a product length LP by a coefficient α. Here, the product length LP is set to an initial value. The coefficient α is set to from 1.1 to 1.5, and is changed depending on a condition such as a shape of the product or a carrying direction.

When the travel distance count value LS while the product sensor is in an ON state is shorter than the value obtained by multiplying the product length LP by the coefficient, it is determined that the products are not in close contact with each other, and then the present STEP advances to STEP 34.

When the travel distance count value LS while the product sensor is in an ON state is longer than the value obtained by multiplying the product length LP by the coefficient, it is determined that the products are in close contact with each other, and then the present STEP advances to STEP 33 (STEP 32).

Subsequently, it is determined that a product on the upstream side is located at a position where the product length LP is subtracted from a position where the product sensor signal becomes an ON state. Likewise, the trace buffer is set. Accordingly, it is possible to manage positions of the products which are in close contact with each other without losing the travel distance which is counted more than a value obtained by multiplying the product length by the coefficient (STEP 33).

As described above, the position of the foremost product on the upstream side is set, and then the product sensor signal virtually becomes an ON state at a position where the foremost product on the upstream side is located, which is referred to as a virtual product sensor ON. Here, the present STEP advances to STEP 32 again to thereby carry out the close contact detection in the same way.

In this way, it is possible recognize a position of the product on the upstream side even when two or more products are in close contact with each other.

The trace buffer Qn which is set above is counted down by the travel distance of the alignment conveyor (STEP 34).

Figure 5:
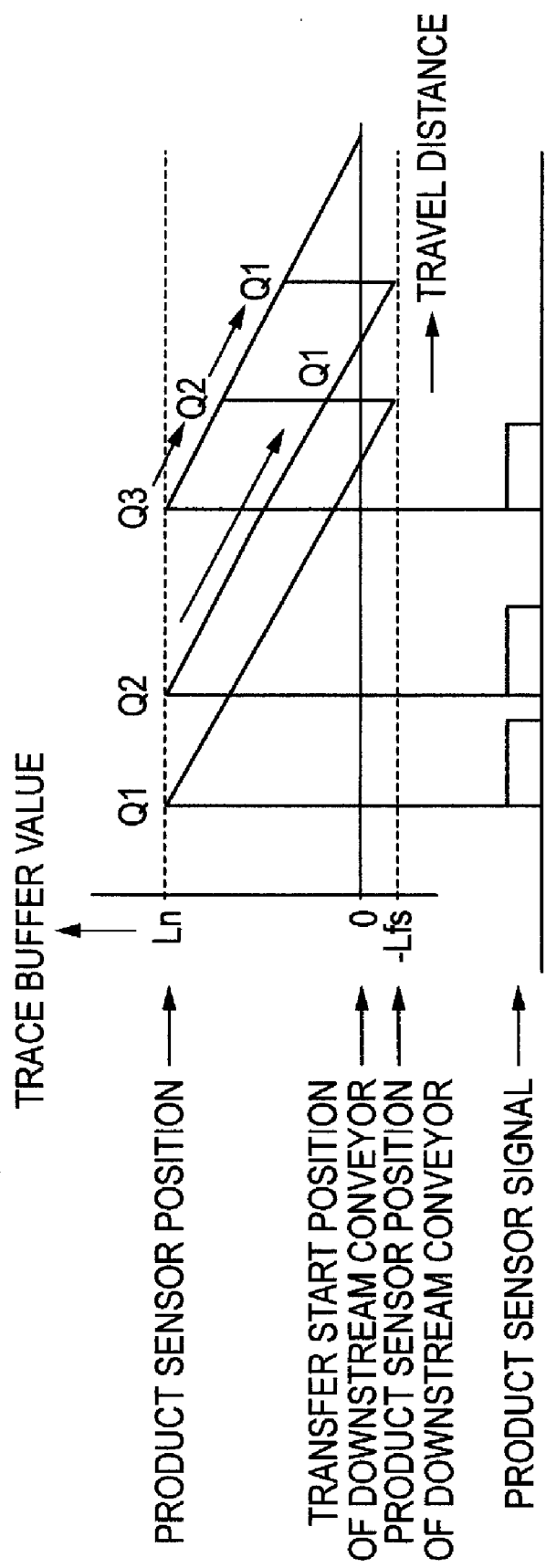
FIG. 5 is a transition diagram illustrating a trace buffer shown in the specific flowchart of the product position management according to the first embodiment of the invention.

FIG. 5 is a transition diagram illustrating a trace buffer shown in the specific flowchart of the product position management according to the first embodiment of the invention, and shows a trace buffer state when three products are carried by the same alignment conveyor.

A transfer start position is a position where the trace buffer Q1 becomes 0, and a transfer end position is a position on the downstream side which is away from the upstream side by a transfer distance Lfs. From this position, a carrying operation or a position correction can be carried out by the downstream conveyor.

As shown in FIG. 5, when the trace buffer Q1 of the foremost product passes 0 and then reaches—(transfer distance Lfs), the present STEP advances to STEP 36 (STEP 35).

In STEP 36, the trace buffer Q1 of the foremost product which is transferred onto the downstream alignment conveyor is removed. Then, the trace buffer Q2 of the subsequent product is shifted to the trace buffer Q1, and the trace buffer Q3 of the subsequent product is sequentially shifted to the trace buffer Q2.

In this way, it is possible to manage the current positions of the products which are loaded on the alignment conveyor including a case of being in close contact with each other by allocating the trace buffers to all products.

Figure 6:
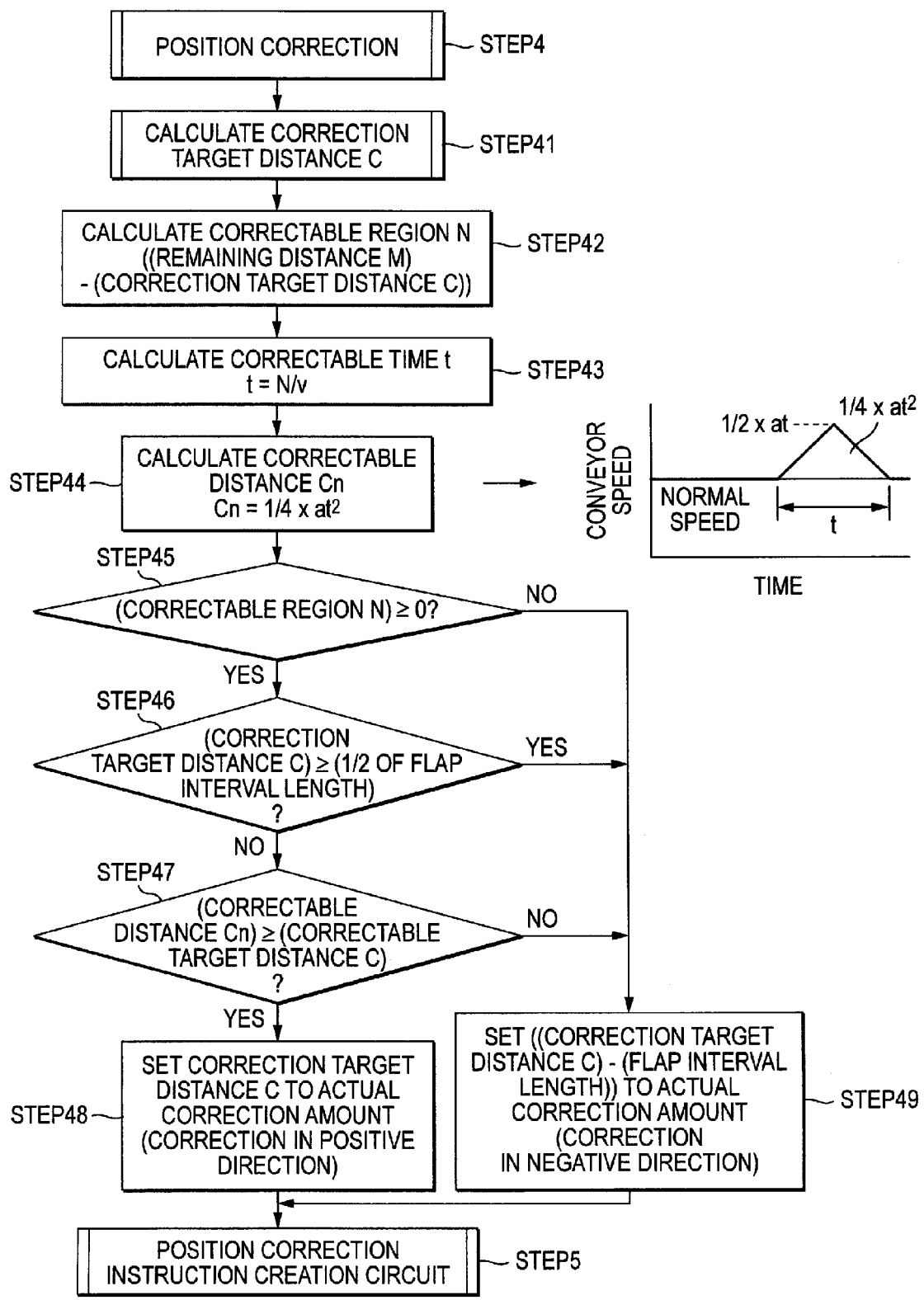
FIG. 6 is a specific flowchart illustrating a position correction calculation shown in the control flowchart according to the first embodiment of the invention.
Figure 7:
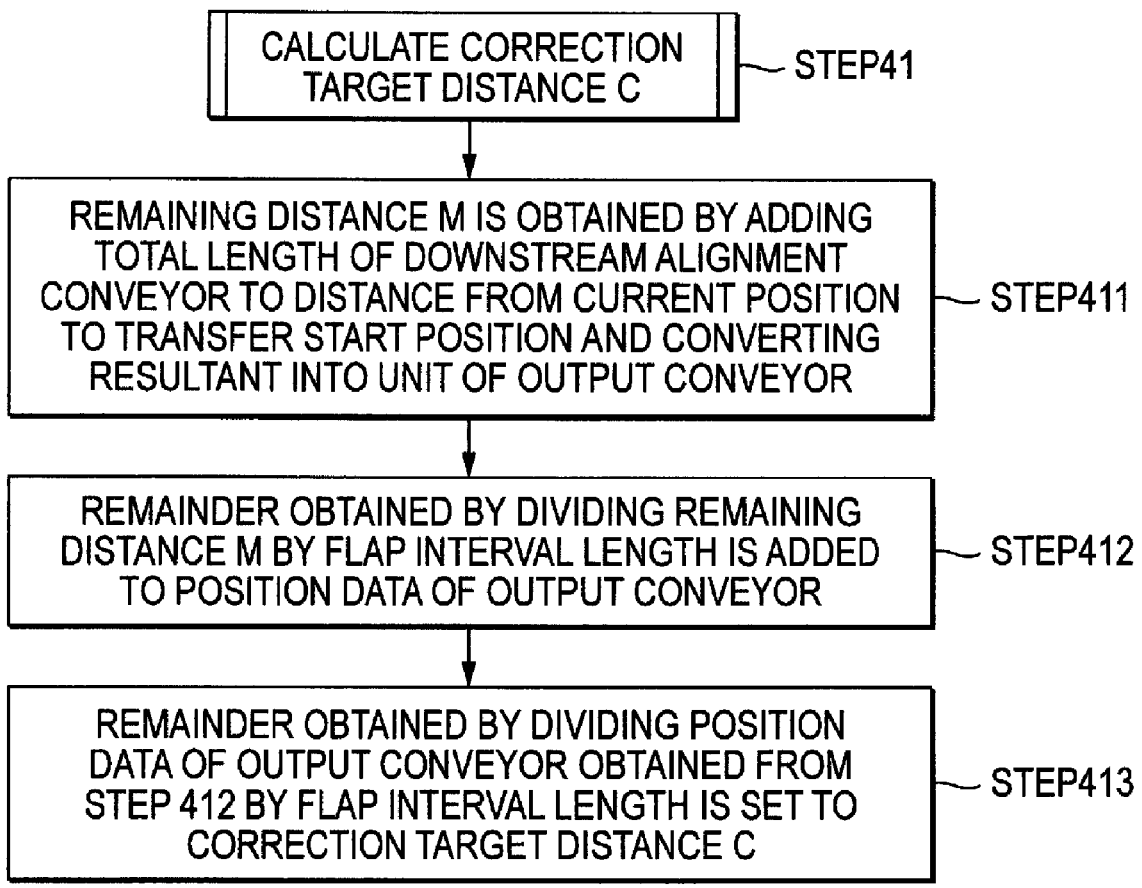
FIG. 7 is a flowchart illustrating a correction target distance calculation shown in the specific flowchart of the position correction calculation according to the first embodiment of the invention.

FIG. 6 is a specific flowchart illustrating a position correction calculation shown in the control flowchart according to the first embodiment of the invention. FIG. 7 is a specific flowchart illustrating a correction target distance calculation.

The position correction calculation is performed by the position correction calculator 713. Hereinafter, a description thereof will be carried out with reference to the drawing.

When the trace buffer of the foremost product loaded on the alignment conveyor becomes −Lfs in STEP 35 shown in FIG. 4, the subsequent product is set to a position correction target.

First, a correction target distance C of the foremost product is calculated (STEP 41).

FIG. 7 is a flowchart illustrating the correction target distance calculation, and a description thereof will be carried out hereinafter with reference to the drawing.

The correction target distance C is a difference between a position where the product which is loaded on the alignment conveyor synchronized with the output conveyor reaches the output conveyor and the transfer position A between the flaps on the output conveyor. Here, since the alignment conveyor is operated while being synchronized with the output conveyor except when the correction operation is performed by the alignment conveyor, even when an additional alignment conveyor is provided between the output conveyor and the alignment conveyor, it is possible to perform the calculation in such a shape that the output conveyor is extended to the upstream side.

First, in the foremost target product at the time point of STEP 35 shown in FIG. 4, a distance from the current position to the transfer start position of the downstream conveyor, that is, a remaining distance M which is obtained by adding a total length of the downstream alignment conveyor to a value of the current trace buffer Q1 and converting the resultant into a unit of the output conveyor is calculated (STEP 411).

Subsequently, a remainder obtained by dividing the remaining distance M by the flap interval length is added to the position data of the output conveyor (STEP 412).

A remainder obtained by dividing the value obtained from STEP 412 by the flap interval length is set to the correction target distance C (STEP 413).

Although the correction target distance is obtained in this way, the description will be carried out again with reference to FIG. 6.

Subsequently, a correctable region N is calculated by subtracting the correction target distance C from the remaining distance M between the current position and the transfer position of the downstream conveyor (STEP 42).

Subsequently, a correctable time t is calculated (STEP 43).

Here, the correctable time t is obtained by dividing the correctable region N by a speed v of the output conveyor.

Subsequently, a correctable distance Cn of the alignment conveyor is calculated (STEP 44).

Here, assuming that an acceleration/deceleration is performed in pyramidal wave shape, the correctable distance is obtained within the correctable time t. The correctable distance Cn corresponds to an area surrounded by a triangle shown in FIG. 7, and the area is $\frac{1}{4} \times at^2$. In addition, the maximum value that a positional slippage does not occur due to the acceleration/deceleration is used as the acceleration a in consideration of the friction between the conveyor and the product.

Accordingly, it is possible to accurately carry out the position correction without a positional slippage during the acceleration/deceleration.

Since the necessary data is prepared as described above, the correction amount or the direction where the position correction is performed is determined.

First, it is compared whether the correctable region N is larger than 0 (STEP 45).

When the correctable region N is positive, the next STEP is performed, but when the correctable region N is negative, the correction is performed in a negative direction in STEP 49.

Subsequently, it is compared whether the correction target distance C is larger than ½ of the flap interval length (STEP 46).

The reason is because the correction is performed in the negative direction when a position after the correction corresponds to the rear part between the flaps in order to prevent a case that two products are inserted to a pocket between the flaps when a large acceleration/deceleration is possible and the correctable distance is larger. In terms of the determination in STEP 48, when the correction target distance C is larger than ½ of the flap interval length, the present STEP advances to STEP 49 and the correction is performed in the negative direction. On the contrary, when the correction target distance C is smaller than ½ of the flap interval length, the present STEP advances to the subsequent STEP.

Finally, the correction target distance C is compared with the correctable distance Cn (STEP 47).

Here, when the correction target distance C≦the correctable distance Cn, the correction can be performed by the amount of the correction target distance, and thus the correction target distance C is set to an actual correction amount. In this case, the position correction is not performed by the downstream alignment conveyor (STEP 48).

Meanwhile, when the correction target distance C≧the correctable distance Cn, the correctable distance is not sufficient, and thus a loading operation is performed at the flap position after one flap position. In this case, a value obtained by subtracting the flap interval length from the correction target distance is set to the actual correction distance. In this case, the correction distance is negative, and the correction is performed by decelerating the alignment conveyor (STEP 49).

In addition, the alignment conveyor is controlled to carry the product at the same speed as that of the subsequent downstream alignment conveyor or the output conveyor except when the alignment conveyor performs the correction operation. That is, even when the subsequent downstream alignment conveyor performs the correction operation, the alignment conveyor is configured to be operated while being synchronized with the subsequent downstream alignment conveyor. This is because the transfer operation needs to be smoothly performed even when the subsequent downstream alignment conveyor performs the correction operation during the transfer operation of the product.

For the synchronization operation with the subsequent downstream alignment conveyor, a subsequent downstream alignment conveyor controller transmits information on a conveyor speed to an upstream alignment conveyor controller.

In addition, when the products are in close contact with each other during the transfer operation, the position correction is performed in such a manner that the products on the upstream side are separated from each other by decelerating the speed of the upstream conveyor when the foremost product is transferred onto the subsequent downstream conveyor.

Figure 8:
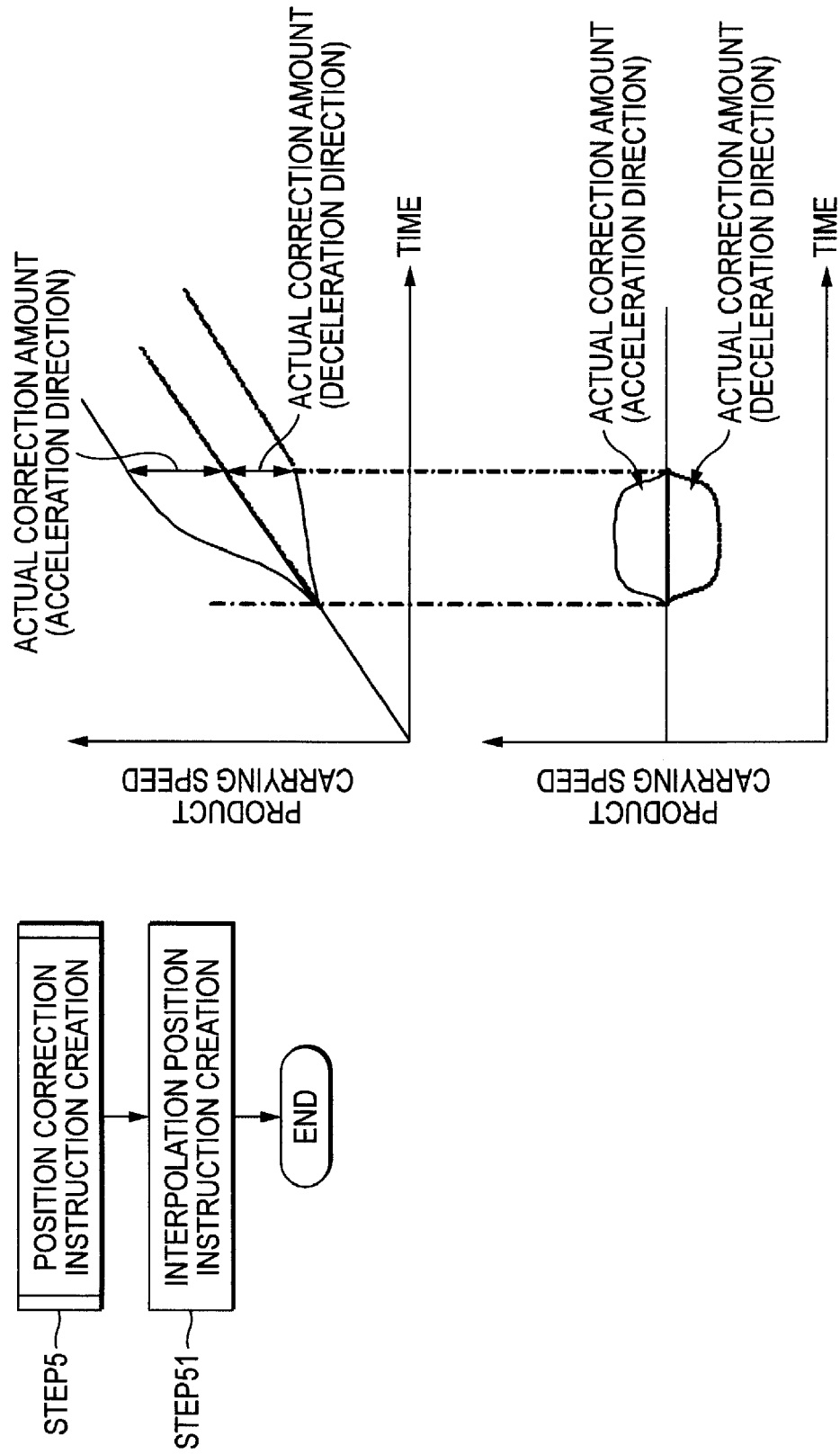
FIG. 8 is a specific flowchart illustrating a position correction instruction creation shown in the control flowchart according to the first embodiment of the invention.

FIG. 8 is a specific flowchart illustrating a position correction instruction creation shown in the control flowchart according to the first embodiment of the invention. The position correction instruction creation is performed by the position correction instruction creator 715.

In an interpolation position instruction creation in STEP 51, the position correction instruction is calculated in order to realize the actual correction amount obtained from STEP 45. Although the correctable distance is calculated in terms of a simple calculation in STEP 44 shown in FIG. 6, at this time, cam data curve for realizing the correctable distance is created. That is, a calculation is performed to obtain the correction amount $\frac{1}{4} \times at^2$ within the correctable time t.

Since a smooth speed instruction data creation method is generally known, a description thereof will be omitted.

In addition, although FIG. 8 shows a direction where the carrying speed is increased or decreased, the interpolation position instruction creation is processed in the same way.

By performing the above-described processes in the alignment conveyor, it is possible to allow the products supplied at random intervals or being in close contact with each other to be aligned at predetermined positions of the output conveyor.

In addition, in this invention, since the controls of the respective alignment conveyors are independently performed, it is possible to add or remove the alignment conveyor in an easy manner.

In this embodiment, although the number of the alignment conveyors is four units, the number of the alignment conveyors may be one unit because of the following reason. In the past, since the correction operation can be performed in a direction where the speed is increased, the products which are in close contact with each other may not be separated from each other in terms of one-time transfer operation. For this reason, the transfer operation needs to be performed by the subsequent conveyor, the number of the alignment conveyors should be two units at minimum. However, in this invention, since the correction operation can be performed in a direction where the speed is decreased, basically the number of the alignment conveyors may be one unit.

Second Embodiment

Figure 9:
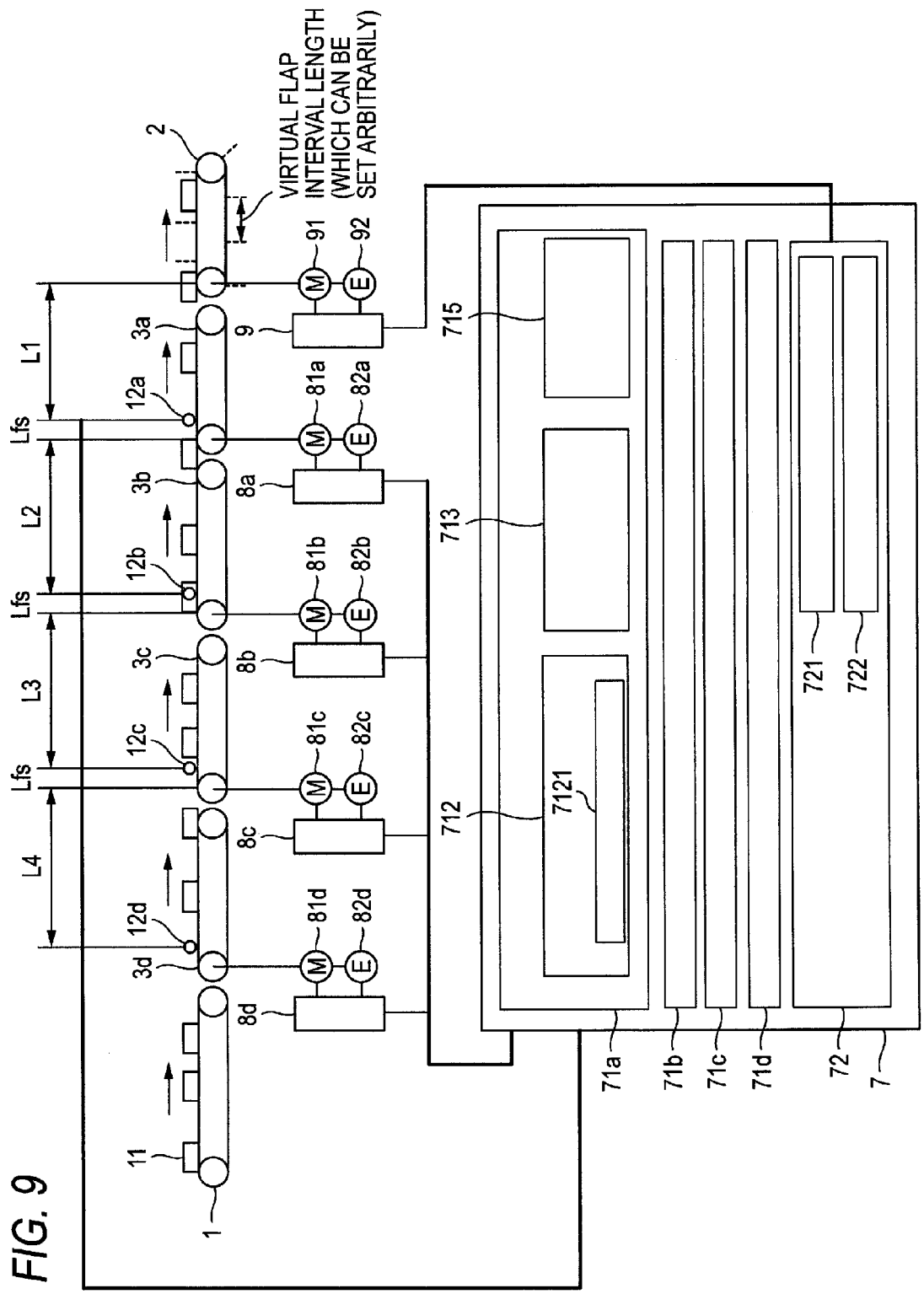
FIG. 9 is a configuration diagram illustrating the alignment conveyor apparatus according to a second embodiment of the invention.

FIG. 9 is a configuration diagram illustrating the alignment conveyor apparatus according to a second embodiment of the invention.

It is different from the first embodiment in that the output conveyor control circuit 72 is provided with a virtual flap sensor 722 instead of the flap sensor 14.

It is possible to turn on the flap detection signal by the flap interval length which is set by the virtual flap sensor 722.

Here, since the flap interval can be arbitrarily set, it is possible to easily handle a case that the product length or the alignment interval needs to be changed without replacing the output conveyor.

INDUSTRIAL APPLICABILITY

The invention is applicable to the alignment conveyor apparatus that allows the products supplied at random intervals to be aligned at predetermined intervals.

The invention claimed is:

1. An alignment conveyor apparatus comprising:
an input conveyor which supplies a product;
an output conveyor which has flaps arranged thereon at the same intervals;
at least two alignment conveyors which are provided between the input conveyor and the output conveyor;
a flap sensor which detects the flaps arranged on the output conveyor;
a product sensor which detects the product transferred onto the alignment conveyors; and
a control unit which is connected to the alignment conveyors and the output conveyor,
wherein the control unit includes an alignment conveyor controller which performs a position management and a position correction of the product on the alignment conveyors, and an output conveyor controller which performs a position management of the output conveyor, and
wherein the output conveyor controller includes an output conveyor position manager which manages a product transfer position between the flaps,
wherein the alignment conveyor controller includes a product position manager which manages a position of the product on the alignment conveyors, a position correction calculator which obtains a position correction amount of the foremost product on the alignment conveyors on the basis of the product transfer position between the flaps and the position of the product on the alignment conveyors, and a position correction instruction creator which creates smooth cam curve data satisfying the position correction amount,
wherein the alignment conveyor controller independently controls the alignment conveyors to be synchronized with the subsequent downstream alignment conveyor except when the position correction of the alignment conveyors is performed, and
wherein the position correction calculator compares a remaining distance from the position of the product to the subsequent downstream conveyor with a correction target distance so that the position correction is performed in a direction in which a speed of the alignment conveyors becomes faster than a predetermined speed when the remaining distance is larger than the correction target distance, or in a direction in which the speed of the alignment conveyors becomes slower than a predetermined speed when the remaining distance is smaller than the correction target distance.

2. The alignment conveyor apparatus according to claim 1, wherein
the position correction calculator obtains a correctable distance by using acceleration which is set within a range not causing a positional slippage during the position correction, and limits the position correction amount on the basis of the correctable distance.

3. The alignment conveyor apparatus according to claim 1, wherein
the product position manager includes a product close contact detector and sets a position of the foremost product on an upstream side to a position which is obtained by subtracting a product length from a start position of a product sensor signal ON in a case that the product close contact detector determines that the products are in close contact with each other when a travel distance of the product sensor signal ON is larger than a value obtained by multiplying the product length by a coefficient.

4. The alignment conveyor apparatus according to claim 3, wherein
when the product close contact detector determines that the products are in close contact with each other, a close contact detection process is performed in such a manner that the position which is obtained by subtracting the product length from the start position of the product sensor signal ON is set to a start position of a virtual product sensor signal ON.

5. The alignment conveyor apparatus according to claim 1, wherein
the output conveyor controller further includes a virtual flap sensor, and
the virtual flap sensor outputs a flap sensor signal at every flap interval length which is arbitrarily set.

6. The alignment conveyor apparatus according to claim 1, wherein
when it is determined that the products are in close contact with each other, the position correction calculator decreases a speed of the upstream alignment conveyor, when the product on the downstream side is transferred onto the downstream alignment conveyor, to allow the position of the product on the upstream side to slowly advance so that the products which are in close contact with each other are separated from each other.

7. The alignment conveyor apparatus according to claim 1, wherein
the output conveyor controller further includes a virtual flap sensor, and
the virtual flap sensor outputs a flap sensor signal at every flap interval length which is arbitrarily set.

* * * * *